(12) United States Patent
Cain

(10) Patent No.: US 9,549,542 B2
(45) Date of Patent: Jan. 24, 2017

(54) INSECT MONITORING DEVICE AND METHOD OF DETECTION

(75) Inventor: David Cain, London (GB)

(73) Assignee: Bed Bugs Limited (GB)

( * ) Notice: Subject to any disclaimer, the term of this patent is extended or adjusted under 35 U.S.C. 154(b) by 381 days.

(21) Appl. No.: 13/144,644

(22) PCT Filed: Jan. 12, 2010

(86) PCT No.: PCT/GB2010/050032
§ 371 (c)(1),
(2), (4) Date: Sep. 23, 2011

(87) PCT Pub. No.: WO2010/082043
PCT Pub. Date: Jul. 22, 2010

(65) Prior Publication Data
US 2012/0012046 A1    Jan. 19, 2012

(30) Foreign Application Priority Data

Jan. 16, 2009    (GB) .................................... 0900669.3
Apr. 14, 2009    (GB) .................................... 0906371.0

(51) Int. Cl.
*A01M 1/00*    (2006.01)
*A01M 1/02*    (2006.01)
*A01M 1/10*    (2006.01)

(52) U.S. Cl.
CPC ............. *A01M 1/026* (2013.01); *A01M 1/103* (2013.01)

(58) Field of Classification Search
CPC ........ A01M 1/026; A01M 1/103; A01M 1/10; A01M 1/2011; A01M 2200/011
USPC ......... 47/107, 132.1, 114, 123, 121; 43/107, 43/132.1, 114, 123, 121

IPC ....................................... A01M 1/10,1/00, 1/02
See application file for complete search history.

(56) References Cited

U.S. PATENT DOCUMENTS

| | | | |
|---|---|---|---|
| 1,259,911 A | | 3/1918 | Siebert |
| 1,261,842 A | | 4/1918 | Mueller |
| 1,655,128 A | * | 1/1928 | Berghorn ........................ 43/114 |
| 3,304,646 A | * | 2/1967 | Staley ............................ 43/131 |
| 4,227,333 A | * | 10/1980 | Levinson et al. ................ 43/107 |
| 4,841,669 A | * | 6/1989 | Demarest ............. A01M 1/2011 43/114 |
| 5,157,866 A | * | 10/1992 | Rosie ...................... A01M 1/02 43/107 |

(Continued)

FOREIGN PATENT DOCUMENTS

| AU | 2006203538 A1 | 3/2008 |
|---|---|---|
| GB | 2443701 A | 5/2008 |

(Continued)

*Primary Examiner* — Thien Thanh Pham
(74) *Attorney, Agent, or Firm* — Fishman Stewart PLLC

(57) ABSTRACT

The invention relates to a bed bug detection device (10) comprising a refuge (16) which elicits a taxis response from bed bugs and a non-trapping indicator surface (18), on which the bed bugs may leave indicators of their presence, such as faecal matter or cast skins. The refuge is positioned in close proximity to said non-trapping indicator surface such that the bed bugs can leave an indicator of their presence as they travel across the indicator surface on their way to or from the refuge. Preferably the non-trapping indicator surface takes the form of a skirt which surrounds a refuge made of corrugated paper. The invention also provides a passive method of detecting the presence of bed bugs without their capture by detecting the presence of indicators rather than the bed bugs per se.

19 Claims, 1 Drawing Sheet

(56) References Cited

U.S. PATENT DOCUMENTS

| | | | | |
|---|---|---|---|---|
| 5,438,792 | A | * | 8/1995 | Monett .................. A01M 1/14 43/114 |
| 5,832,658 | A | * | 11/1998 | Randon ........................... 43/131 |
| 6,189,393 | B1 | * | 2/2001 | Cates .................... A01M 1/026 73/865.8 |
| 6,517,856 | B1 | * | 2/2003 | Roe et al. ..................... 424/410 |
| 7,757,433 | B2 | * | 7/2010 | Levot ............................. 43/121 |
| 2006/0016121 | A1 | | 1/2006 | Ballard et al. |
| 2007/0044372 | A1 | * | 3/2007 | Lang et al. ..................... 43/114 |
| 2008/0115406 | A1 | * | 5/2008 | Duston ................ A01M 29/34 43/131 |

FOREIGN PATENT DOCUMENTS

| WO | WO-2007/027601 A2 | 3/2007 |
|---|---|---|
| WO | WO-2008/051501 A2 | 5/2008 |

* cited by examiner

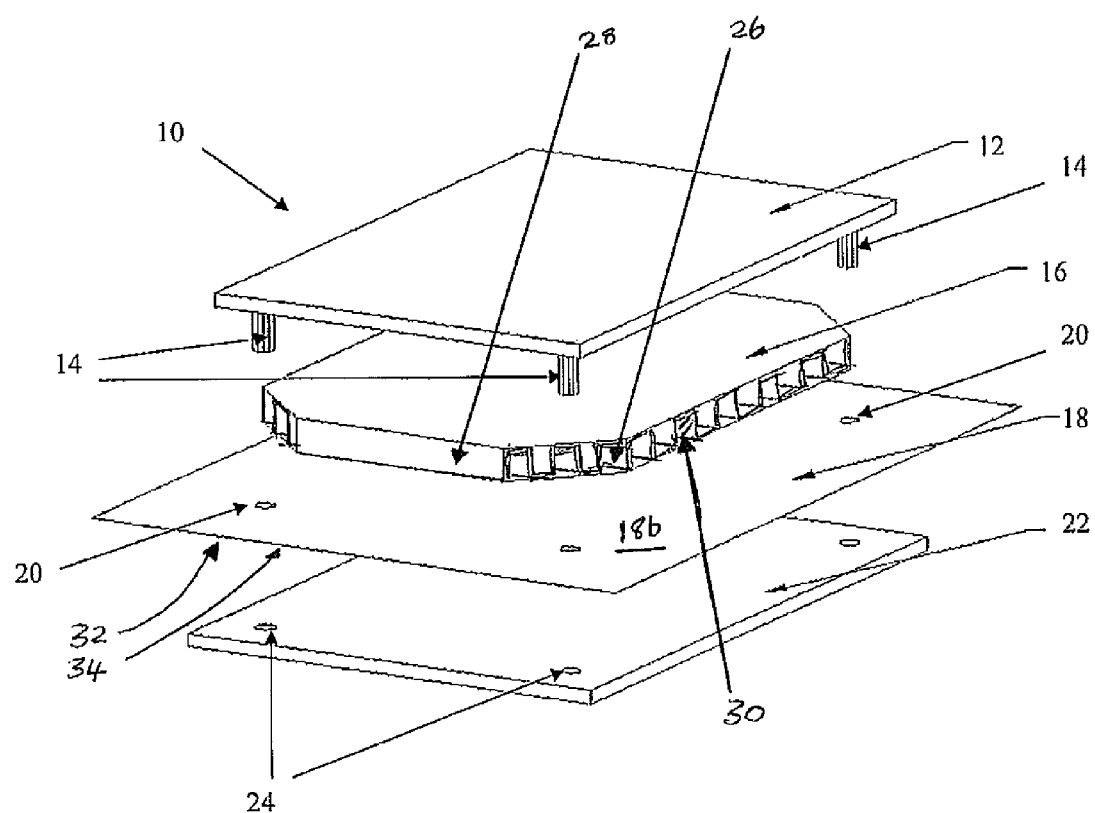

INSECT MONITORING DEVICE AND METHOD OF DETECTION

This application claims priority to United Kingdom patent applications GB 0900669.3 filed on Jan. 16, 2009 and GB 0906371.0, filed on Apr. 14, 2009, and PCT/GB2010/050032 filed on Jan. 12, 2010, all of which are hereby incorporated by reference in their entirety.

FIELD OF THE INVENTION

This invention relates to an insect monitoring device and a method of detection. More particularly it relates to a device and method for passively monitoring small biting insects, particularly bed bugs (*Cimex lectularus*, and *Cimex hemipterus*).

BACKGROUND TO THE INVENTION

Bed bugs (*Cimex lectularius* and *Cimex hemipterus*) are small insects that feed off the blood of humans and other warm-blooded hosts. Bed bugs usually spend daylight hours in dark enclosed sites and have a preference for crevices in fabric, wood and paper. The bed bugs create a microenvironment in which they live during the day. In recent years, there has been a world-wide increase in the prevalence of bed bugs.

Bed bugs are attracted to the heat and carbon dioxide given off by warm-blooded hosts, which make bedrooms, and especially mattresses and headboards, an ideal environment for them to take refuge. Bed bugs are known for being elusive, transient and mainly active at night, making their detection difficult. They may be transferred between locations on furniture, bags, clothes or people.

As personal injury litigation injury is on the rise, hotels, transport providers and many other service sectors are at risk of expensive court actions should a customer receive a bite from, or pick up, bed bugs. Therefore, there is a need, at least in hotel rooms, to easily identify whether a location is inhabited by bed bugs so that it can be treated.

The most common method of detection of bed bugs is by identifying the bites, which they inflict on the bed occupant. The bites inflict a dermatological reaction in humans, but this usually cannot be felt until some minutes or hours and in some cases days after the bug bites and the first indication of a bite usually comes from the desire to scratch the bite site. Generally, it shows up as either a raised red bump or a flat welt, often in groups of three or so following the line of a vein.

Clearly waiting for the bed bugs to bite has many disadvantages, for example the bites are very similar to mosquito bites and therefore difficult to identify. Detecting the bugs before they bit would be better. One method of detecting bed bugs is to have a readily available light source, such as a torch, and shining it on the bed during the night to try and catch any bed bugs that are active. A disadvantage of this is that movement of the person in the bed may alert the bed bugs and they can then scatter.

Another current method of detecting bed bugs is to use glue traps, often in conjunction with a heat pad and carbon dioxide source to attract the bugs. Such devices are expensive and require the use of an electrical source to keep the carbon dioxide source and heat pad running. This makes them unsuitable for use in hotel rooms due to the expense of the initial purchase and subsequent cost of running.

Using double-sided carpet tape as, effectively, another form of glue trap has been proposed. However, the bed bugs may find ways to avoid the tape and the tape is unsightly.

The worldwide increase in the prevalence of bed bugs, referred to earlier, is caused by reasons which need not be explored here. But it highlights the need for a solution to the problems they cause and this brief review of known attempts to detect and eliminate them (all of which are based around active capture) shows that there is no clear starting point— and indeed no satisfactory universal solution from which the problem may be tackled.

SUMMARY OF THE INVENTION

In contrast to known (active) methods which seek to capture the bedbugs, the present invention is based on applying a number of behavioural observations. These include the observation that:
   a) bedbugs prefer not soil their place of refuge, but rather defecate outside;
   b) bed bugs particularly favour, as a refuge, a material comprising crevices, tunnels or the like which creates a dark microenvironment in which the bed bugs may live during the day, particularly corrugated paper or card which may additionally act as a sensory and/or chemical attractant; and
   c) bed bugs, when captured by, for example an adhesive trap, produce an alarm pheromone warning others of danger.

By applying the knowledge gained from observation, the applicant has designed a novel, passive, bed bug detection device and detection methodology.

According to a first aspect of the present invention there is provided a bed bug detection device comprising:
   a. a refuge which elicits a taxis response from bed bugs; and
   b. a non-trapping indicator surface, on which the bed bugs may leave indicators of their presence, such as faecal matter or cast skins,
said refuge being positioned in close proximity to said non-trapping indicator surface such that the bed bugs can leave an indicator of their presence as they travel across the indicator surface on their way to or from the refuge.

A taxis response is the responsive movement of a free-moving organism toward or away from an external stimulus.

Preferably the refuge is made of a material comprising crevices, tunnels or the like which creates a dark microenvironment in which the bed bugs may live during the day. A particularly favoured material is corrugated paper or card which may act as a sensory and/or chemical attractant to the bed bugs. i.e. it is a material which the bed bugs have a sensory affinity to.

It is important that the materials used do not contain chemicals, including some solvents, which illicit a detrimental response away from the device. Some coated papers may illicit a detrimental response.

Preferred materials include paper, wood and fabric.

Manila paper or card has been found to be a particularly good material, especially when corrugated.

Preferably the non trapping surface comprises a skirt which surrounds and extends out from the refuge. The skirt may abut up to the refuge or the refuge may sit on or over a sheet, the outer perimeter area of which acts as the skirt. A skirt proves effective because the bed bugs behaviour means they defecate in the immediate vicinity of their refuge rather than in the refuge itself. Thus, the positioning of a non-trapping indicator skirt immediately surrounding the refuge maximises the likelihood of detecting their presence.

The refuge, or more precisely its crevices or tunnels may be coated or filled with a marker which can be transferred onto the bed bugs and carried and deposited on the indicator surface providing an additional or alternative identification means. The marker may be an indicator e.g. a colour visible to the naked eye or one which may be visible under, for example UV radiation.

Preferably the indicator surface is selected to contrast with the bed bugs, and is preferably a light shade, more preferably white or beige. It is also preferably slightly absorbent so that indicators such as faeces and cast skins mark or stick to the indicator.

Preferably, all or part of the underside of the skirt comprises an adhesive, allowing the device to be attached to a surface. Preferably, the adhesive is covered by a peelable protective layer which can be removed prior to sticking the device to a surface.

Whilst, at its simplest form the device may be a two piece device comprising the refuge and a non-trapping indicator surface, it is desirable to provide a degree of physical protection so as to prevent the device being crushed. The detection device may therefore further comprise one or more protective elements. In a preferred embodiment, rigid upper and lower protective elements are provided, preferably with one or more rigid spacers there between. In such an embodiment the device takes the form of a pad with the refuge and non trapping surface sandwiched there between. In this embodiment the skirt of the non-trapping indicator surface extends beyond the perimeter of the protective elements where it is easily visible.

According to a further aspect of the present invention there is provided a passive method of detecting the presence of bed bugs without their capture comprising using a device which:
  a) elicits a taxis response, attracting the bedbugs to a location; and
  b) allows their presence to be identified by the presence of indicators, such as faecal matter or cast skins, which the bed bugs deposit on a non-trapping indicator surface provided at the location.

Preferably the device is substantially flat and the refuge comprises crevices, tunnels or the like which are so sized and shaped that bed bugs can crawl into them and inhabit the refuge. The refuge is made of a material, and has an internal wall surface, which elicits a taxis response, attracting the bed bugs to the refuge. This taxis response may be, for example, a sensory or chemo taxis response. One material which generates a very strong taxis response is paper or cardboard, particularly corrugated paper or card, more particularly still Manila paper. Manila paper is a type of paper originally made from Manila hemp. It is usually beige in color and the fibers are usually visible to the naked eye. Manila paper is a semi-bleached chemical sulfate paper.

Other materials, such as, for example, wood or fabric may however be used to create a refuge.

When such a detector is placed in or is attached to a bed, a bed headboard or a mattress the bed bugs will be enticed to crawl into the crevices and tunnels of the refuge and can survive comfortably there throughout daylight hours or for times between feeds. In going to or from the refuge they will crawl over the non-trapping indicator surface and may leave an indicator of their presence, such as, but not exclusively faeces or cast skins.

By inspecting the device at regular intervals the presence of bed bugs can be detected, and if detected an appropriate action taken e.g. use of active traps and or extermination.

Indeed the devices of the present invention can be made into active devices by, for example, the inclusion of an insecticide and/or trapping elements such as adhesive within the device or by the inclusion of a sensor to detect the presence of live samples.

The refuge most preferably comprises a corrugated composite sheet of wood, fibre board cardboard or paper, or a combination of these or other suitable materials with which bed bugs are known or discovered to have a sensory and or chemical affinity. Such corrugated sheets are typically a composite of three sheets, top and bottom sheets, with a third corrugated sheet sandwiched between. They make an ideal refuge and in combination with the non-trapping indicator provide a solution to the problem of producing a cheap and effective bed bug detection device and method.

Preferably the indicating surface is a substantially flat sheet of material which surrounds the entire area of the refuge.

A device according to the invention may be attached to a surface to which bed bugs may be attracted in a variety of ways. Most preferred is the use of an adhesive on the device. This may be on the underside of the indicating surface or skirt or on the underside of the lower support. Preferably the adhesive is covered by a peelable backing member.

The use of an adhesive on the underside of the skirt is particular desirable as it means the device can not be easily reused once it has been removed and it is unlikely to re-used in another location.

The simple design also makes assembly cheap.

BRIEF DESCRIPTION OF THE DRAWINGS

An embodiment of the invention will now be described, by way of example only, with reference to the accompanying drawing, in which:

FIG. 1 is an exploded perspective view of a device according to the present invention.

DETAILED DESCRIPTION OF EXEMPLARY EMBODIMENT

The single FIG. 1 of the drawing shows a bed bug detector (10) in the form of a sandwiched pad of components which, in use, is substantially flat and square. The device (10) comprises two essential components, a refuge (16) and a non-trapping indicator surface (18) comprising a skirt (18b) surrounding the refuge, which in the embodiment illustrated are sandwiched between upper (12) and lower (22) protective sheets of flat thin rigid plastics which are connected to one another via a plurality of spacers (14) which take the form of posts disposed inwardly of the protective sheets corners.

The refuge (16) can take a number of forms, but in the preferred embodiment illustrated, takes the form of a corrugated component made of paper or card whose corrugations define an array of parallel open-ended tunnels (26) defining dark encloses sites (28) into which the bed bugs can hide. The material attracts the bed bugs by sensory and/or chemo taxis. The skilled addressee will recognise that alternative materials and forms may be used.

The refuge (16) is positioned centrally on a sheet of, for example, white matt paper (18) the area of which extending outwardly from the refuge defines a non-trapping indicator skirt (18b). The underside (32) of the skirt may be coated with an adhesive (34) and has a peelable cover layer (not shown) so as to facilitate its positioning on, for example, the headboard of a bed.

To prevent the device being easily crushed, the device is preferably sandwiched between rigid plastics upper (12) and lower (22) protective sheet supports which may be connected to one another via a plurality of spacer posts (24).

To simplify assembly of the device (10), or composite pad, the refuge (16) is placed on the centre of a sheet of white paper (18) leaving a non-trapping indicator skirt (18b) surrounding the refuge. These are then clamped together between protective sheets (12) and (22) which are welded or glued together though spacers (24) which project from an upper sheet (12) and which enter holes (24) in lower sheet (22). Pre formed holes (20) made in the non-trapping indicator surface facilitate ease of assembly.

The tunnels in the refuge may be coated or filled with a marker (30) which may be deposited on the bedbugs and transferred by the bed bugs to the indicator skirt. The marker compound can be a visible marker compound or one which is only visible under UV light.

The device or pad constitutes a throwaway item intended for so-called one shot usage only.

In use, the device allows detection not by the physical capture of bed bugs but rather passively by observing tell tale signs which indicate their presence. These tell tale signs include, in particular, faecal deposits and cast skins.

The method is effective because the bed bugs behave in particular ways:
  a) Firstly they are particularly attracted to a refuge with crevices offering sensory and/or chemical attractants, such as corrugated card; and
  b) Secondly, they tend to defecate not inside their refuge but rather immediately outside.

Thus, by using a refuge in combination with a non-trapping indicator which skirts or surrounds the refuge, the presence of bed bug activity can be detected by viewing the indicator surface surround or skirt. By avoiding the use of trapping adhesives or certain chemicals e.g. those found on some glossy materials, defence pheromones are not released and early detection can be achieved.

The invention claimed is:

1. A bed bug detection device, which is not based on active capture but rather by passively observing telltale signs which indicate their presence, comprising:
  a refuge which elicits a taxis response from bed bugs, the refuge including at least a first wall and a second wall arranged one on top of the other and each terminating at a surrounding peripheral edge that defines a perimeter of the refuge, wherein the refuge has an interior disposed between the first wall and the second wall, the interior defining a shaded microenvironment including at least one of a plurality of tunnels and a plurality of crevices, wherein the refuge further includes at least one opening in communication with the interior disposed at a peripheral side between the first wall and the second wall; and
  a skirt having a non-trapping indicator surface disposed outside the refuge and being visible to an observer, wherein the non-trapping indicator surface is slightly absorbent so that indicators comprising faeces and cast skins mark or stick to the non-trapping indicator surface;
  a substantially flat sheet of material, wherein said refuge is positioned on the flat sheet in close proximity to said non-trapping indicator surface, the flat sheet having a peripheral portion extending outwardly from the refuge that defines the skirt having the non-trapping indicator surface; and
  an assembly comprises at least two outer layers of material substantially covering the refuge, the at least two outer layers including a first outer layer and a second outer layer each having a surrounding peripheral edge that defines a further perimeter of the assembly, wherein the perimeter of the assembly is greater than the perimeter of the refuge, wherein the refuge and the flat sheet are sandwiched between the first outer layer and the second outer layer;
  wherein the skirt having the non-trapping indicator surface extends outwardly beyond the perimeter of the refuge and the further perimeter of the assembly such that the bed bugs are detected by observing indicators comprising faeces and cast skins which are left on the non-trapping indicator surface by the bed bugs as they travel across the skirt on their way to or from the refuge.

2. The bed bug detection device of claim 1, wherein the flat sheet is composed of a paper material.

3. The bed bug detection device of claim 1 wherein the non-trapping indicator surface is one of a color and a shade to contrast with the bed bugs faecal matter or cast skins.

4. The bed bug detection device of claim 1, wherein the microenvironment comprises the plurality of crevices disposed between the first wall and the second wall.

5. The bed bug detection device of claim 1, wherein the microenvironment comprises the plurality of tunnels disposed between the first wall and the second wall.

6. The bed bug detection device of claim 1, wherein the microenvironment further includes dark enclosed sites disposed between the first wall and the second wall.

7. The bed bug detection device of claim 1 wherein the refuge comprises a material to which the bed bugs have one of a chemical and a sensory affinity.

8. The bed bug detection device of claim 7 wherein the material to which the bed bugs have an affinity is one of i) wood, ii) fabric, and iii) paper.

9. The bed bug detection device of claim 7, wherein the material comprises Manila paper.

10. The bed bug detection device of claim 1, wherein the refuge comprises a corrugated composite structure including a corrugated section arranged between the first wall and the second wall, the corrugated section at least partially defining the microenvironment.

11. The bed bug detection device of claim 1 wherein an underside of the flat sheet comprises an adhesive for securing to a surface.

12. The bed bug detection device of claim 1, wherein at least one of the at least two outer layers is a protective element composed of a substantially rigid material that covers the refuge.

13. The bed bug detection device of claim 1, wherein the first outer layer includes an upper protective element and the second outer layer includes a lower protective element for shielding the refuge, wherein the refuge and the flat sheet defining the skirt are sandwiched between the upper protective element and the lower protective element.

14. The bed bug detection device of claim 1, wherein the at least two outer layers are composed of a plastic material.

15. A bed bug detection device, comprising:
  a sandwiched assembly which passively monitors telltale signs of bed bugs to indicate their presence, the sandwiched assembly including:

a refuge which elicits a taxis response from the bed bugs, the refuge defining an interior including a shaded microenvironment for the bed bugs to occupy, wherein the microenvironment defines an array of passages for eliciting the taxis response, wherein the refuge includes a first wall and a second wall arranged one on top of the other and defining the interior therebetween, the first wall and the second wall each having an outer surrounding edge that defines a perimeter of the refuge;

a skirt arranged outside the refuge, the skirt extending outwardly beyond the perimeter of the refuge and at least partially surrounding the refuge;

a substantially flat sheet of material and the refuge is positioned on the flat sheet, wherein the flat sheet has a portion extending outwardly beyond the perimeter of the refuge that defines the skirt; and at least two rigid protective elements each having an extent covering the perimeter of the refuge, the at least two protective elements including an upper protective element and a lower protective element, each of the at least two protective elements having a peripheral edge that defines a further perimeter greater than the perimeter of the refuge, wherein the refuge and the flat sheet defining the skirt are sandwiched between the upper protective element and the lower protective element;

wherein the skirt has a non-trapping indicator surface disposed exterior to the perimeter of the refuge so that the skirt having the non-trapping indicator surface is clearly visible by an observer, and wherein the skirt having the non-trapping indicator surface extends outwardly beyond the further perimeter of the at least two protective elements so that the bed bugs are detected by observing indicators comprising faeces and cast skins which are left on the non-trapping indicator surface of the skirt by the bed bugs as the beg bugs travel across the skirt on their way to or from the refuge.

16. The bed bug detection device of claim 15, wherein the upper protective element and the lower protective element are structured as flat sheets of plastic that define the further perimeter.

17. The bed bug detection device of claim 15, wherein the refuge comprises a corrugated composite structure including the first wall, the second wall and a corrugated section comprising the microenvironment, wherein the corrugated composite structure is composed of at least one of a wood material, a cardboard material and a paper material.

18. The bed bug detection device of claim 15, wherein the non-trapping indicator surface of the skirt is disposed at least partially exterior to the further perimeter and visible to an observer.

19. The bed bug detection device of claim 15, wherein the flat sheet is composed of a paper material.

* * * * *